(12) United States Patent
Saeki et al.

(10) Patent No.: US 7,460,965 B2
(45) Date of Patent: Dec. 2, 2008

(54) ELECTRIC POWER CALCULATING APPARATUS, ELECTRIC POWER CALCULATING METHOD, TAMPER RESISTANCE EVALUATING APPARATUS, AND TAMPER RESISTANCE EVALUATING METHOD

(75) Inventors: Minoru Saeki, Tokyo (JP); Daisuke Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 214 days.

(21) Appl. No.: 11/579,953

(22) PCT Filed: Jul. 7, 2004

(86) PCT No.: PCT/JP2004/009632

§ 371 (c)(1),
(2), (4) Date: Nov. 9, 2006

(87) PCT Pub. No.: WO2006/006198

PCT Pub. Date: Jan. 19, 2006

(65) Prior Publication Data

US 2007/0219735 A1    Sep. 20, 2007

(51) Int. Cl.
*G06F 21/06* (2006.01)

(52) U.S. Cl. .............................. 702/57; 702/58; 702/60; 702/69

(58) Field of Classification Search .................. 702/57, 702/60, 80, 117, 182, 188–190, 58, 69; 324/110, 324/142; 340/870.02; 700/286, 285; 713/193, 713/200
See application file for complete search history.

(56) References Cited

U.S. PATENT DOCUMENTS 5,994,892 A * 11/1999 Turino et al. ................ 324/142

(Continued)

FOREIGN PATENT DOCUMENTS

JP    05-073634 A    3/1993

(Continued)

OTHER PUBLICATIONS

Akihiko Sasaki et al., "Simulation ni yoru DES Jisso no DPA Tansei Hyoka", The Institute of Electronics, Information and Communication Engineers Gijutsu Kenkyu Hokoku, JP, The Institute of Electronics, Information and Communication Engineers, vol. 103, No. 710, Mar. 15, 2004, pp. 25 to 30 (IT 2003-60), page 27, left column, line 4 to page 28, left column, line 13.

(Continued)

*Primary Examiner*—Eliseo Ramos-Feliciano
*Assistant Examiner*—Felix Suarez
(74) *Attorney, Agent, or Firm*—Birch, Stewart, Kolasch & Birch, LLP

(57) ABSTRACT

It is a purpose to evaluate a tamper resistance of an actual circuit with a high accuracy and at a high speed in an upstream process of a circuit design. A tamper resistance evaluating apparatus includes a signal change time counter unit 10 for counting the number of times a signal in a logic circuit changes, a power consumption calculation unit 20 for calculating a power consumption in the logic circuit based on the number of times a signal changes, which is counted by the signal change time counter unit, a leaked-information analysis unit 80 for analyzing information leaked from the logic circuit based on the power consumption in the logic circuit calculated by the power consumption calculation unit, a file database 40 for storing a file used by a simulator 30, a simulation control information producing unit 50 for producing control information for controlling the logic simulator 30, a time sequence electric power information producing unit 60 for producing time sequence electric power information, in which the power consumptions calculated by the power consumption calculation unit 20 are arranged in a time sequence, and a result displaying unit 70 for displaying the time sequence electric power information.

15 Claims, 15 Drawing Sheets

U.S. PATENT DOCUMENTS

| | | | |
|---|---|---|---|
| 6,075,932 | A | 6/2000 | Khouja et al. |
| 6,236,197 | B1 * | 5/2001 | Holdsclaw et al. .......... 324/110 |
| 2003/0093684 | A1 | 5/2003 | Kaiserswerth et al. |
| 2004/0064715 | A1 * | 4/2004 | Kaminaga et al. ........... 713/193 |
| 2005/0039040 | A1 * | 2/2005 | Ransom et al. ............. 713/200 |

FOREIGN PATENT DOCUMENTS

| | | |
|---|---|---|
| JP | 09-026456 A | 1/1997 |
| JP | 2000-242676 A | 9/2000 |
| JP | 2003-085233 A | 3/2003 |

OTHER PUBLICATIONS

Ors et al., Information Technology: Coding and Computing (ITCC'04), vol. 2, Apr. 5, 2004, pp. 546-552 XP010697144.

Saputra et al., Proceedings of the Design, Automation and Test in Europe Conference and Exhibition (Date'03) Design, Automation and Test in Europe Conference And Exhibition, Mar. 3, 2003, pp. 84-89 XP010673360.

Yu et al., Proceedings of the Ninth International Symposium on Asynchronous Circuits and Systems, May 12, 2003, pp. 206-215 XP006010830.

Yuan et al., IEE Proc-Comput. Digit, Tech., vol. 145, No. 2, Mar. 23, 1998, pp. 89-95 XP006010830.

Vijaykrishnan et al., "The Design of use of SimplePower: A Cycle-Accurate Energy Estimation Tool", Six (6) pages.

* cited by examiner

Fig. 2

EXAMPLE OF TEST BENCH

```
integer i;
   reg log_enable;
   reg [0:3] log_counter;
   initial begin
        $set_gate_level_monitoring("on");
          $set_toggle_region(test_top.s0);
`include    "veri_incl.v"
   end
   always @(posedge clk or negedge rst_l) begin
        if (`rst_l) begin
                log_enable      <= 1'b0;
                log_counter     <= 4'h0;
           end
           else begin
                if (txen==1'b1) begin
                        log_enable      <= 1'b1;
                        log_counter     <= 4'hF;
                        $toggle_start();
                end
                else begin
                        if (log_enable==1'b1) begin
                                log_counter     <= log_counter - 1'b1;
                                $toggle_stop();
`include    "veri_case_net.v"
                                $toggle_reset();
                                i = i + 1;
                                if (log_counter==4'h0) begin
                                        log_enable <= 1'b0;
                                end
                                else begin
                                        $toggle_start();
                                end
                        end
                end
           end
   end
```

Fig. 3

EXAMPLE OF FILE TO BE REFERRED TO BY TEST BENCH

EXAMPLE OF FILE TO BE REFERRED TO BY TEST BENCH

```
    case (i)
        159200    : $toggle_report("saif/sim_net_159200.saif",
1.0e-12, "test_top.s0");
        159201    : $toggle_report("saif/sim_net_159201.saif",
1.0e-12, "test_top.s0");
             :                    : (ELLIPSIS)
        159997    : $toggle_report("saif/sim_net_159997.saif",
1.0e-12, "test_top.s0");
        159998    : $toggle_report("saif/sim_net_159998.saif",
1.0e-12, "test_top.s0");
        159999    : $toggle_report("saif/sim_net_159999.saif",
1.0e-12, "test_top.s0");
    endcase
```

Fig. 6

EXAMPLE OF PROGRAM FOR CALCULATING POWER CONSUMPTION

```
count_all_toggle(fpr)
FILE *fpr;
char *instance;
{
char buf[200];
char term[20];
int tc, sum, i;
unsigned int ptr;

tc = 0;
        sum = 0;
        while (fgets(buf, 200, fpr) != NULL) {
                ptr = (unsigned int)strstr(buf," (TC");
                if (ptr == NULL) continue;
                get_term(ptr+3, term);
                for (i=0;i<20;i++) {
                        if (term[i] == ')') {
                                term[i] = NULL;
                                break;
                        }
                }
                tc = atoi(term);
                sum += tc;
        }
    return(sum);
}
```

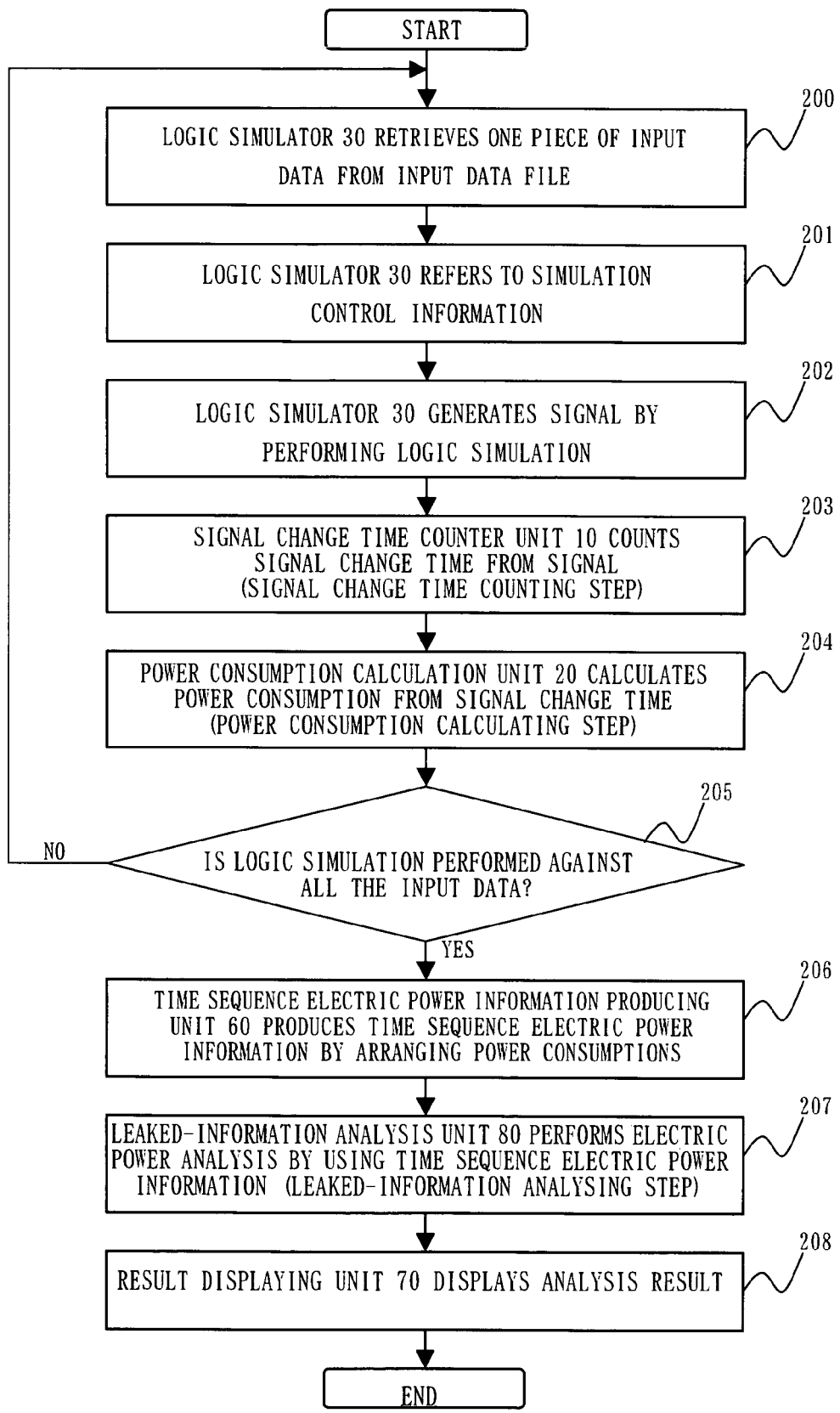

Fig. 9

EXAMPLE OF PROGRAM FOR CALCULATING POWER CONSUMPTION

```
count_instance_toggle_0delay(fpr, instance)
FILE *fpr;
char *instance;
{
char buf[200];
char term[20];
int tc, sum, i, flag;
unsigned int ptr;

tc = 0;
   sum = 0;
   flag = 0;
   while (fgets(buf, 200, fpr) != NULL) {
           if (flag == 0) {
                   // SEARCH FILE FROM THE TOP UNTIL GIVEN INSTANCE NAME IS FOUND
                   ptr = (unsigned int)strstr(buf," (INSTANCE");
                   if (ptr == NULL) continue;
                   get_term(ptr+9, term);
                   if (strcmp(term, instance) == 0) flag = 1;
           }
           else {
                   // EXTRACT TOGGLE NUMBER IN CURRENT INSTANCE UNTIL ANOTHER
                   INSTANCE APPEARS
                   ptr = (unsigned int)strstr(buf," (INSTANCE");
                   if (ptr != NULL) break;
                   ptr = (unsigned int)strstr(buf," (TC");
                   if (ptr == NULL) continue;
                   get_term(ptr+3, term);
                   for (i=0;i<20;i++) {
                           if (term[i] == ')') {
                                   term[i] = NULL;
                                   break;
                           }
                   }
                   tc = atoi(term);
                   tc %= 2;          // DISREGARD TRANSIENT TRANSITION
                   sum += tc;
           }
   }
   return(sum);
}
```

Fig. 10

EXAMPLE OF PROGRAM FOR CALCULATING POWER CONSUMPTION

```
count_instance_toggle(fpr, instance)
FILE *fpr;
char *instance;
{
char buf[200];
char term[20];
int tc, sum, i, flag;
unsigned int ptr;

tc = 0;
   sum = 0;
   flag = 0;
   while (fgets(buf, 200, fpr) != NULL) {
          if (flag == 0) {
                 // SEARCH FILE FROM THE TOP UNTIL GIVEN
                   INSTANCE NAME IS FOUND
                 ptr = (unsigned int)strstr(buf," (INSTANCE");
                 if (ptr == NULL) continue;
                 get_term(ptr+9, term);
                 if (strcmp(term, instance) == 0) flag = 1;
          }
          else {
                 // EXTRACT TOGGLE NUMBER IN CURRENT INSTANCE UNTIL
                   ANOTHER INSTANCE APPEARS
                 ptr = (unsigned int)strstr(buf," (INSTANCE");
                 if (ptr != NULL) break;
                 ptr = (unsigned int)strstr(buf," (TC");
                 if (ptr == NULL) continue;
                 get_term(ptr+3, term);
                 for (i=0;i<20;i++) {
                         if (term[i] == ')') {
                                 term[i] = NULL;
                                 break;
                         }
                 }
                 tc = atoi(term);
                 sum += tc;
          }
   }
   return(sum);
}
```

EXAMPLE OF RESULT OF DIFFERENTIAL POWER ANALYSIS

EXAMPLE OF RESULT OF DIFFERENTIAL POWER ANALYSIS

EXAMPLE OF RESULT OF DIFFERENTIAL POWER ANALYSIS (a) RESULT OF TAMPER RESISTANCE EVALUATION USING REAL DEVICE (b) RESULT OF TAMPER RESISTANCE EVALUATION USING EMBODIMENT

IN A CASE OF OPERATION MODE WHEREIN DIFFERENTIAL POWER IS RELATIVELY LARGE (a) RESULT OF TAMPER RESISTANCE EVALUATION USING REAL DEVICE (b) RESULT OF TAMPER RESISTANCE EVALUATION USING EMBODIMENT

IN A CASE OF OPERATION MODE WHEREIN DIFFERENTIAL POWER IS RELATIVELY SMALL

ELECTRIC POWER CALCULATING APPARATUS, ELECTRIC POWER CALCULATING METHOD, TAMPER RESISTANCE EVALUATING APPARATUS, AND TAMPER RESISTANCE EVALUATING METHOD

TECHNICAL FIELD

The present invention relates to an electric power calculating apparatus and an electric power calculating method for calculating electric power consumed in a logic circuit by a logic simulation of a circuit. The present invention further relates to a tamper resistance evaluating apparatus and a tamper resistance evaluating method for detecting a leakage of information from a logic circuit based on the calculated power consumption in a logic circuit, and for evaluating a tamper resistance of a logic circuit.

BACKGROUND ART

A semiconductor device for performing security functions such as cipher is performed a tamper resistance evaluation for evaluating whether or not secret information, such as an encryption key, is leaked based on a power consumption in a circuit.

Conventionally, as methods for the tamper resistance evaluation, there have been methods for evaluating whether or not secret information is leaked by measuring a power consumption by using a real device, and methods for evaluating whether or not secret information is leaked by performing a simulation of a logic circuit to calculate a power consumption at a designing stage of a semiconductor device.

As the methods by simulation among the aforementioned methods, there are methods for detecting a leakage of information by calculating the power consumption based on a specific bit or a hamming weight in an intermediate variable appears (or expected to appears) in a process of an encryption processing by a simulation with a software, and methods for detecting a leakage of information by calculating the power consumption by performing a detailed simulation of a circuit with a circuit simulator (Refer to a non-patent literature 1 for examples of both the methods).

Calculation of a power consumption by a logic simulation is performed in the following manner. A typical semiconductor device now being used is a CMOS, and most of its power consumption is made by a switching power P for discharging and charging a load. Therefore, a power consumption in a circuit can be described as a value of adding the products of a change value f per unit time for each signal, load capacitance C and a square of voltage V, as described in a formula (1).

$$P=\Sigma fCV^2 \qquad (1)$$

Here, f is a value derived from a logic simulation, and V is a fixed value. Besides, C is calculated based on a net list describing a connection of a circuit and a library. When calculating the power consumption by a logic simulation, it takes much time in calculating the load capacitance C.

Non-patent literature 1: "TECHNICAL REPORT OF IEICE", IT2003-60, ISEC2003-100, WBS2003-178 (March, 2004)

DISCLOSURE OF THE INVENTION

Problems to be Solved by the Invention

However, there are problems as follows in a tamper resistance evaluating method using the conventional simulations. First, there is a problem in a simulation by a software in that a simulator has a defect that it cannot approximate the power consumption in an actual circuit with a high accuracy, and it is obscure whether or not a correct evaluation can be performed. Furthermore, there is a problem in that the method is of little use for clarifying mechanisms of from what part of a circuit and how information is leaked.

On the other hand, in a case of the method for performing a detailed simulation using a circuit simulator, the process takes extremely much time and what is more, requires detailed information of the circuit. Therefore, there is a problem in that the method cannot be applied to a use of evaluating a tamper resistance without difficulty in an upstream process of a circuit design, and as a result, the design and evaluation cannot be performed efficiently.

The present invention is made to solve these problems, and one of its purpose is to evaluate a tamper resistance in an actual circuit with a high accuracy and at a high speed in processes including a logic design and its upper-stream processes of a circuit design (hereinafter called as an upstream process).

Means to Solve the Problems

To solve the above-mentioned problems, an electric power calculating apparatus is designed to calculate the power consumption based on an accumulated value of the number of times signals in a logic circuit change.

Further, a tamper resistance evaluating apparatus for detecting a leakage of information from a logic circuit and for evaluating a tamper resistance of a logic circuit includes a signal change time counter unit for counting and storing in a signal change time memory unit the number of times signals in a logic circuit change, a power consumption calculation unit for calculating a power consumption in the logic circuit based on the number of times signals in the logic circuit change, which is stored in the signal change time memory unit by the signal change time counter unit, and a leaked-information analysis unit for analyzing information leaked from the logic circuit based on the power consumption in the logic circuit calculated by the power consumption calculation unit.

Effect of the Invention

According to the present invention, it is possible for an electric power calculating apparatus to calculate a power consumption in a logic circuit based on an accumulated value of the number of times signals in the logic circuit change, which is outputted from a logic simulator for a circuit.

Further, it is possible for a tamper resistance evaluating apparatus to detect a leakage of information from a logic circuit and to evaluate a tamper resistance of a logic circuit by counting and storing in a signal change time memory unit the number of times signals in the logic circuit change with a signal change time counter unit, calculating the power consumption in the logic circuit based on the number of times signals in the logic circuit change, which is stored in the signal change time memory unit, with a power consumption calculation unit, and analyzing information leaked from the logic circuit based on the calculated power consumption in the logic circuit with a leaked-information analysis unit.

BRIEF DESCRIPTION OF THE SEVERAL VIEWS OF THE DRAWINGS

FIG. 2 is a part of an example of the test bench simulation according to the first embodiment.

FIG. 3 is an example of a file referred to by the test bench according to the first embodiment.

FIG. 4 is an example of a file referred to by the test bench according to the first embodiment.

FIG. 6 is an example of the program for finding the sum total of signal change times form the signal change times, and for calculating a power consumption according to the first embodiment.

FIG. 8 is a flowchart describing the processes of the tamper resistance evaluating apparatus according to the second embodiment.

FIG. 9 is an example of a program for counting that a signal changes one time when the signal changes for an odd number of times, and that a signal changes zero times when the signal changes for an even number of times in one clock cycle according to the third embodiment.

FIG. 10 is an example of the program for the processes of changing circuit parts among a larger circuit part, counting the number of times a signal changes in each circuit part, and calculating a power consumption in the circuit parts according to the fourth embodiment.

PREFERRED EMBODIMENTS FOR CARRYING OUT THE INVENTION

Embodiment 1

In the first embodiment, an embodiment is described wherein a power consumption in a logic circuit is calculated by an electric power calculating apparatus in a tamper resistance evaluating apparatus, based on the number of times signals in the logic circuit change, which is outputted from a logic simulator in the tamper resistance evaluating apparatus.

The electric power calculating apparatus in the tamper resistance evaluating apparatus calculates the power consumption based on an accumulated value of the number of times signals in the logic circuit change.

Figure 1:
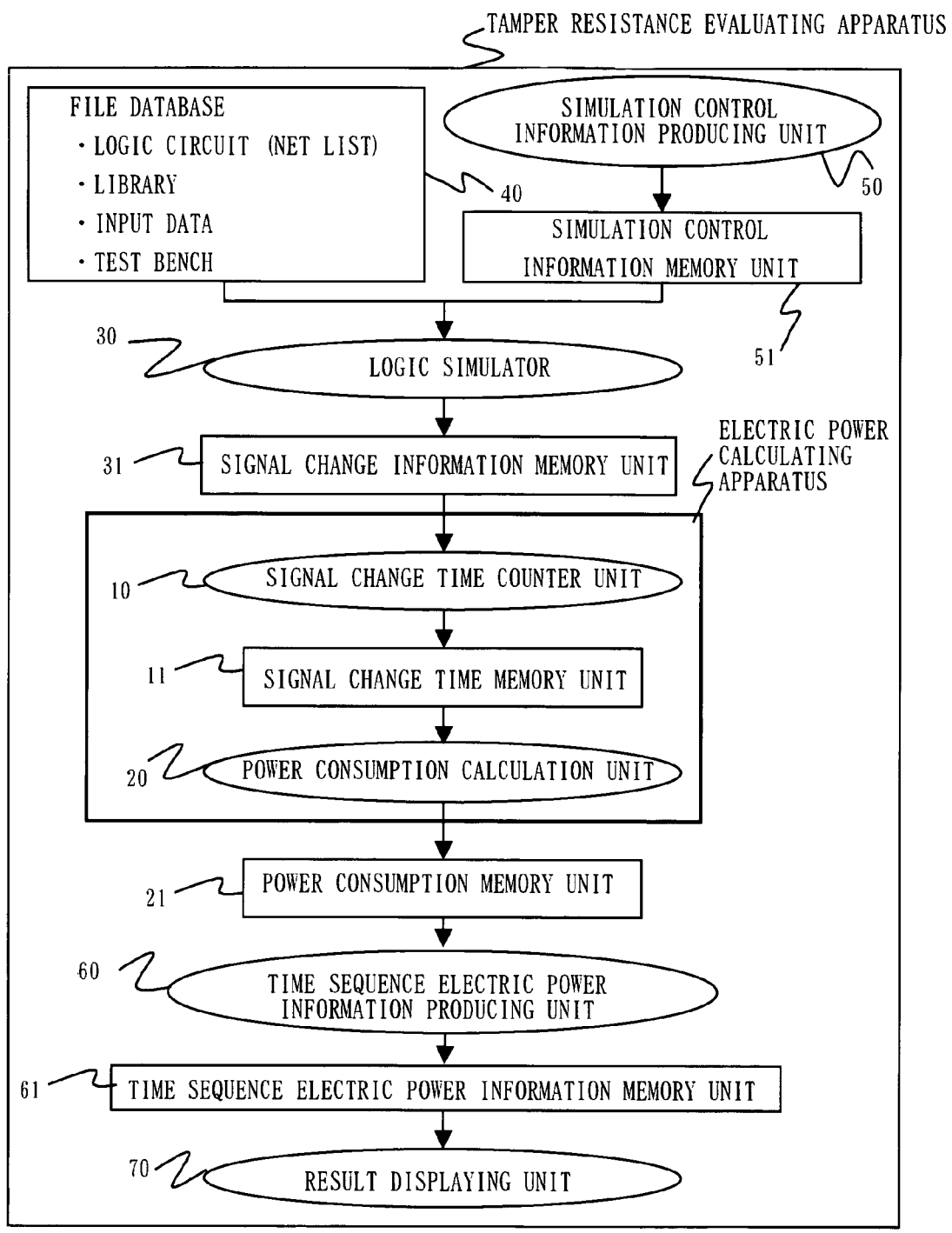
FIG. 1 is a diagram describing a structure of the electric power calculating apparatus according to the first embodiment.

FIG. 1 is a diagram describing a configuration of the tamper resistance evaluating apparatus according to the first embodiment. As shown in FIG. 1, the electric power calculating apparatus constitutes a part of the tamper resistance evaluating apparatus. In this configuration, the electric power calculating apparatus includes a signal change time counter unit 10 for counting and storing in a signal change time memory unit the number of times signals in a logic circuit change, and a power consumption calculation unit 20 for calculating a power consumption in the logic circuit based on an accumulated value of the number of times signals of the logic circuit change, which is stored in the signal change time memory unit by the signal change time calculation unit 10.

Further, the tamper resistance evaluating apparatus includes in addition to the electric power calculating apparatus, a logic simulator 30 for performing a simulation of operations in a logic circuit, a signal change information memory unit 31 for storing change of the signals outputted by the logic simulator 30, a file database 40 for storing a file to be used by the logic simulator 30, a simulation control information producing unit 50 for producing simulation control information for controlling the logic simulator 30, and a simulation control information memory unit 51 for storing the simulation control information produced by the simulation control information producing unit 50.

Further, the tamper resistance evaluating apparatus includes a power consumption memory unit 21 for storing the power consumption calculated by the power consumption calculation unit 20, a time sequence electric power information producing unit 60 for retrieving the power consumptions from the power consumption memory unit 21, for arranging them in a time sequence, and for producing time sequence electric power information, a time sequence electric power information memory unit 61 for storing the time sequence electric power information produced by the time sequence electric power information producing unit 60, and a result displaying unit for retrieving from the time sequence electric power information memory unit 61 and for displaying the time sequence electric power information.

The signal change time counter unit 10 counts and stores in the signal change time memory unit the number of times signals in the logic circuit change. The power consumption calculation unit 20 calculates a power consumption in the logic circuit based on an accumulated value of the number of times the signals in the logic circuit change, which is stored in the signal change time counter unit 10.

It is herein explained a power consumption calculating method used in the first embodiment. In the power consumption calculating method using the aforementioned formula (1), it takes much time in calculation of load capacitance C. However, in a case of evaluating a tamper resistance of a logic circuit with a high accuracy and at a high speed in an upstream process of a circuit design, so high an accuracy is not needed for the power consumption to be calculated. Therefore, the power consumption is calculated by using a formula (2) by ascribing all the load capacitance C of signals as almost the same, and by performing an approximation by a change value f per time unit for each signal. In this way, it is possible to shorten the processing time significantly.

$$P = \Sigma f \tag{2}$$

It is returned to explanations for functions of each unit. The logic simulator 30 is an ordinal logic simulator used in a logic design of a digital circuit, which generates all the signals indicating what changes of signals occurred in a logic circuit as a subject. The file database 40 stores a logic circuit, a net list, a library, an input data file and a test bench used by the logic simulator 30. Theses are referred to all through the period of time of the logic simulation.

The simulation control information producing unit 50 produces control information for each unit simulation, when the logic simulator 30 performs a simulation by dividing the simulation into a plural number of times of simulations wherein the time of each simulation is shifted (each simulation is herein called as "unit simulation"), and does not perform the simulation all the period of time at once. The produced file is referred to when the test bench controls start and end of the simulation.

The time sequence electric power information producing unit 60 arranges power consumptions in a logic circuit in a prescribed period of time calculated by the power consumption calculation unit 20, in a time sequence, and produces one time sequence electric power information. Further, the time sequence electric power information producing unit 60 converts the time sequence electric power information in a format suitable for display. A result displaying unit 70 displays the time sequence electric power information produced by the time sequence electric power information producing unit 60.

The test bench is a file wherein the whole operations of the logic simulator 30 are described. For example, inputs or outputs of a file by the logic simulator 30, and time information specifying timings of start and end of a logic simulation are described.

FIG. 2 is a part of an example of the test bench, which is a description for extracting signal change information for each unit simulation. When a logic circuit as a subject performs a process, signal change information for each clock cycle is output to different files.

Specifically, when a unit simulation starts, one piece of input data is retrieved from the input data file, a logic simulation of a logic circuit as a subject is performed, then the number of times signals outputted from the logic simulator change is counted, and the result is outputted to a file.

In FIG. 2, files are referred to (include) in two parts. Examples of the files to be referred to are described in FIG. 3 and FIG. 4. FIG. 3 is a file that holds a head number of input data used in a unit simulation. In the example of FIG. 3, the head number of input data is "159200". FIG. 4 is a file that specifies a file name to record signal change information generated in the unit simulation. In the example of FIG. 4, when the input data is "159200" (head number), the signal change information is recorded in "saif/sim_net_159200. saif", and when the input data is "159201", the signal change information is recorded in "saif/sim_net_159201. saif". These are both simulation control information, which are produced by the simulation control information producing unit 50, before the logic simulator 30 is started.

Figure 5:
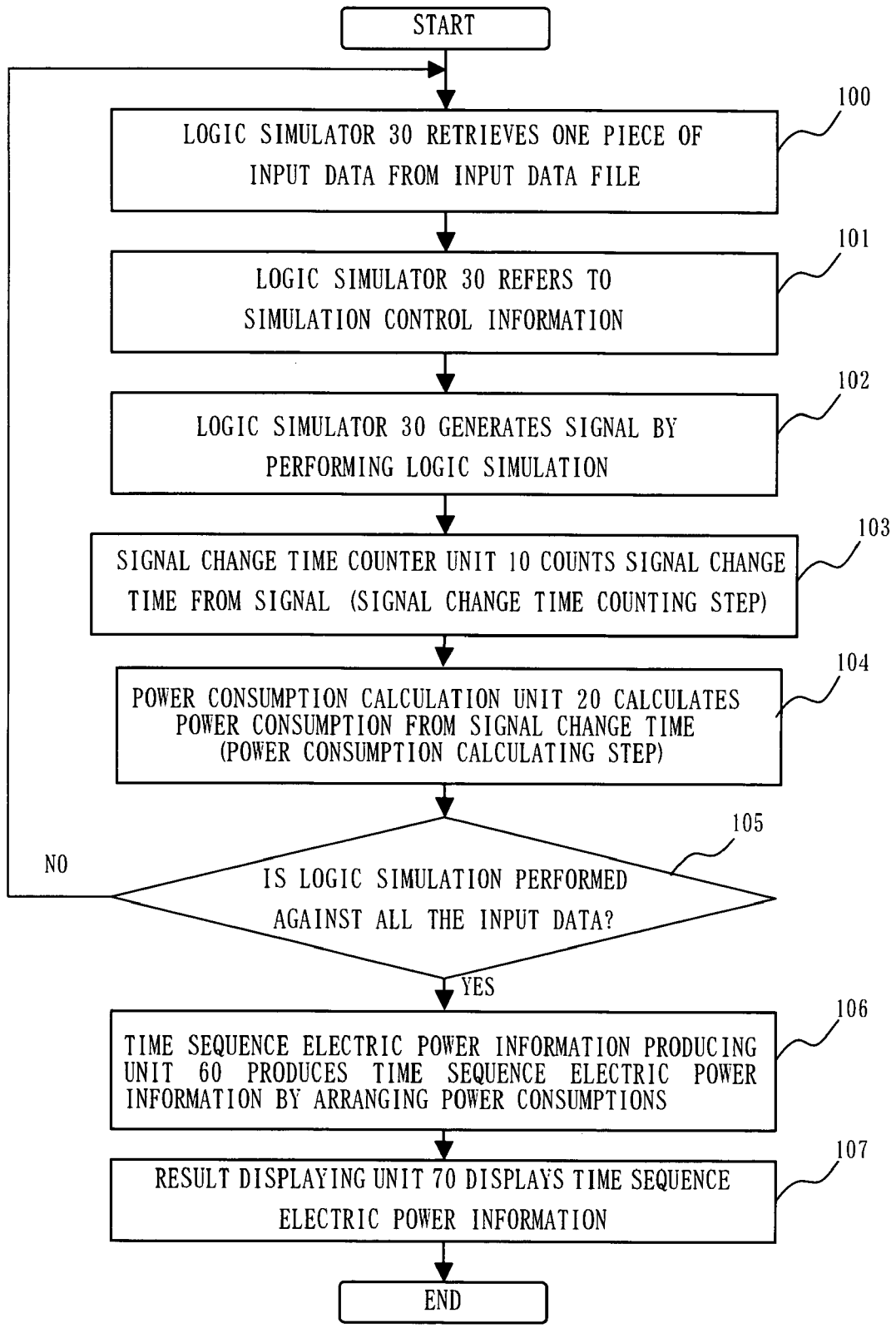
FIG. 5 is a flowchart describing the processes of the electric power calculating apparatus according to the first embodiment.

It is next explained operations in the tamper resistance evaluating apparatus including the electric power calculating apparatus according to the first embodiment. FIG. 5 is a flowchart describing an electric power calculating process in the tamper resistance evaluating apparatus including the electric power calculating apparatus.

The electric power calculating apparatus in the tamper resistance evaluating apparatus performs a signal change time counting step for counting and storing in the signal change time memory unit the number of times signals in a logic circuit change, and a power consumption calculating step for calculating the power consumption in the logic circuit based on an accumulated value of the number of times signals in the logic circuit change, which is stored in the signal change time memory unit by the signal change time counting step.

A logic circuit subject to calculation of a power consumption, a net list of the logic circuit, a library used in a logic simulation, input data first input to the logic circuit, and a test bench used in the logic simulation are stored in the file database 40. A plurality of pieces of the input data are prepared, and they are retrieved and used each time a unit simulation is repeated.

The logic circuit as a subject among the above is retrieved from the file database 40 and configured by the logic simulator 30.

The simulation control information producing unit 50 is configured to produce simulation control information beforehand, and the logic simulator 30 refers to the simulation control information with the test bench, which controls start/end of the logic simulation.

First, operations of a unit simulation are explained. The logic simulator 30 retrieves a piece of input data from the input data file stored in the file database 40 (Step S100). Then, the logic simulator 30 refers to the simulation control information of the simulation control information producing unit 50 according to a description in the test bench (Step S101).

The logic simulator 30 performs a simulation of logical operations of the logic circuit as a subject, based on the retrieved input data, produces and stores in the signal change information memory unit 31 signals for each clock cycle of the logic circuit as signal change information (Step S102).

The signal change time counter unit 10 retrieves a signal change time from the signal change information memory unit 31, counts and stores in the signal change time memory unit 11 the number of times signals in the logic circuit change (hereinafter referred to as a "signal change time") (Step S103). This is the aforementioned signal change time counting step. Now, the signal change time is the number of times signals change for each clock cycle during the periods of time wherein a circuit subject to an evaluation operates, in one time of a unit simulation.

The power consumption calculation unit 20 retrieves the signal change time from the signal change time memory unit 11, calculates the power consumption using the formula (2), and stores the power consumption in the power consumption memory unit 21 (Step S104). This is the aforementioned power consumption calculating step.

That is, Step S103 and Step S104 correspond to processes of the electric power calculating apparatus in the tamper resistance evaluating apparatus.

An example of a program for finding the sum total of the signal change times and calculating a power consumption in the power consumption calculation unit 20 is described in FIG. 6. In this program, a signal change time TC of all the signals is extracted by the power consumption calculation unit 20 from a file fpr wherein the signal change times counted by the signal change time counter unit 10 are recorded, and the total sum of the extracted TC is found. Sum is output to an output file designated by the test bench described in FIG. 4.

An entry example of the signal change times in the file fpr (an example of a file format in the signal change time memory unit 11) is described in a table 1. Further, an entry example of a total sum of the extracted TC in the file (an example of a file format in the power consumption memory unit 21) is described in a table 2.

TABLE 1

| SIGNAL NAME | SIGNAL CHANGE TIME TC |
|---|---|
| a0 | 3 |
| a1 | 5 |
| a2 | 9 |
| a3 | 4 |
| a4 | 6 |
| a5 | 7 |
| a6 | 2 |
| a7 | 10 |

TABLE 2

| TOTAL sum | 46 |
|---|---|

The file fpr wherein the signal change times are entered as described in the table 1, and the file wherein the total sum is entered as described in the table 2 are created for each unit simulation.

The above-mentioned is one time of a unit simulation. That is, it is calculated in the unit simulation the power consumption in a logic circuit within a period of time indicated by the simulation control information, based on retrieved input data.

Next, the logic simulator 30 detects whether or not a logic simulation is performed against all the input data recorded in the input data file in the file database 40 (Step S105). When the logic simulations against all the input data are completed (when it is "Yes" in Step S105), it is proceeded to Step S106. When the logic simulations are not completed (when it is "No" in Step S105), it is returned to Step S100.

When the unit simulations against all the input data are finished, the time sequence electric power information producing unit 60 retrieves the power consumptions in the logic circuit, which are generated for the number of times the unit simulations are repeated, from the power consumption memory unit 21. The time sequence electric power information producing unit 60 then arranges the power consumptions in accordance with time information referred from the simulation control information when the unit simulations are performed, generates and stores in the time sequence electric power information memory unit 61 one or a plural pieces of time sequence electric power information (Step S106). The result displaying unit 70 retrieves the time sequence electric power information from the time sequence electric power information memory unit 61, and displays the time sequence electric power information in the same environment as in a case of an analysis of a real device, for example, by employing a display format by an oscilloscope etc. (Step S107)

In the way mentioned above, it is possible to calculate a power consumption consumed in a logic circuit as a subject in a certain period of time by a logic simulation.

According to the present embodiment, it is possible for the electric power calculating apparatus in the tamper resistance evaluating apparatus to calculate a power consumption, based on an accumulated value of the number of times signals in the logic circuit output by the logic simulation change. In this way, it becomes unnecessary to calculate a load capacitance, and therefore, it becomes possible to calculate a power consumption in a logic circuit in a processing time shorter than ever before.

According to the present embodiment, the electric power calculating apparatus may be composed of the signal change time counter unit and the power consumption calculation unit. As a result, it becomes possible for the electric power calculating apparatus to count the number of times signals in a logic circuit change at the signal change time counter unit, and calculates a power consumption in a logic circuit based on an accumulated value of the number of times signals change at the power consumption calculation unit.

Here, the calculation of $P=\Sigma f$ by the electric power calculating apparatus in the tamper resistance evaluating apparatus shows that a power consumption is calculated only based on the number of times signals in a logic circuit change.

In this case, the electric power calculating apparatus in the tamper resistance evaluating apparatus includes the signal change time counter unit 10 counting and storing in the signal change time memory unit the number of times signals in a logic circuit change, and the power consumption calculation unit 20 calculating a power consumption in a logic circuit based only on the number of times signals in the logic circuit change, which is stored in the signal change time memory unit by the signal change time counter unit 10.

Further, the electric power calculating apparatus performs a signal change time counting step for counting and storing in the signal change time memory unit the number of times signals in a logic circuit change, and a power consumption calculating step for calculating the power consumption in the logic circuit based only on the number of times signals in the logic circuit change, which is stored in the signal change time memory unit by the signal change time counting step.

In this case, it is possible for the electric power calculating apparatus to calculate the power consumption based only on the number of times signals in a logic circuit output by a logic simulation change. In this way, it becomes unnecessary to calculate a load capacitance, and therefore, it becomes possible to calculate the power consumption in a logic circuit in a processing time shorter than ever before.

Further, the electric power calculating apparatus may be composed of the signal change time counter unit and the power consumption calculation unit. As a result, it becomes possible for the electric power calculating apparatus to count the number of times signals in a logic circuit change at the signal change time counter unit, and to calculate the power consumption in a logic circuit based only on the number of times signals change at the power consumption calculation unit.

Embodiment 2

In the second embodiment, it is described an embodiment wherein the tamper resistance evaluating apparatus detects a leakage of information from a logic circuit, based on a power consumption in the logic circuit calculated by the electric power calculating apparatus based on the number of times signals in the logic circuit output by a logic simulator change, and evaluates a tamper resistance of the logic circuit. Further, it is described an embodiment wherein analysis of leaked information performed therein by using the power consumption in a circuit is Differential Power Analysis, Simple Power Analysis, and Timing Analysis.

Figure 7:
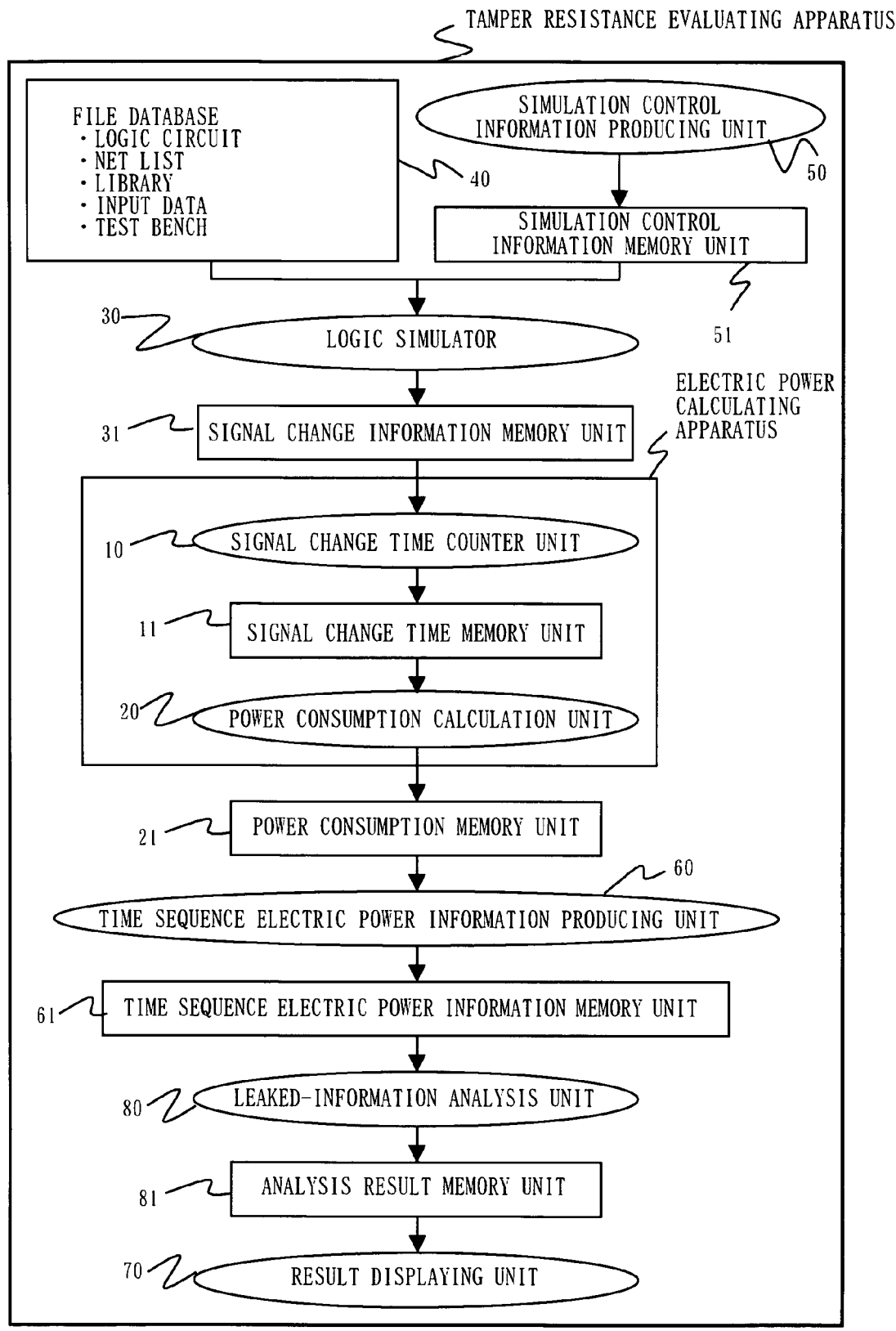
FIG. 7 is a diagram describing a structure of the tamper resistance evaluating apparatus according to the second embodiment.

FIG. 7 is a diagram describing a structure of the tamper resistance evaluating apparatus according to the second embodiment.

The tamper resistance evaluating apparatus detecting a leakage of information from a logic circuit and evaluating a tamper resistance of the logic circuit includes a signal change time counter unit 10 for counting and storing in a signal change time memory unit 11 the number of times signals in the logic circuit change, a power consumption calculation unit 20 for calculating a power consumption in the logic circuit based on the number of times the signals in the logic circuit change, which is stored in the signal change time memory unit 11 by the signal change time counter unit, and a leaked-information analysis unit 80 for analyzing information leaked from the logic circuit based on the power consumption in the logic circuit calculated by the power consumption calculation unit. The aforementioned electric power calculating apparatus may be used for the signal change time counter unit 10 and the power consumption calculation unit 20 among the above-mentioned units.

Further, the tamper resistance evaluating apparatus includes a logic simulator 30 for performing a simulation of operations of a logic circuit, a signal change information memory unit 31 for storing changes of signals output by the logic simulator 30, a file database 40 for storing files used by the logic simulator 30, a simulation control information producing unit 50 for producing simulation control information for controlling the logic simulator 30, and a simulation control information memory unit 51 for storing the simulation control information produced by the simulation control information producing unit 50.

Additionally, the tamper resistance evaluating apparatus includes a power consumption memory unit 21 for storing the power consumption calculated by the power consumption calculation unit 20, a time sequence electric power information producing unit 60 for retrieving the power consumptions from the power consumption memory unit 21 and for producing time sequence electric power information, in which the power consumptions are arranged in a time sequence, a time sequence electric power information memory unit 61 for storing the time sequence electric power information produced by the time sequence electric power information producing unit 60, an analysis result memory unit 81 for storing an analysis result of an analysis by the leaked-information analysis unit 80, and a result displaying unit for retrieving the analysis result from the analysis result memory unit 81 and displaying the analysis result.

Meanwhile, the leaked-information analysis unit 80 in the tamper resistance evaluating apparatus retrieves the time sequence electric power information from the time sequence electric power information memory unit 61, performs an analysis, and stores the analysis result in the analysis result memory unit 81.

Functions of each unit in the tamper resistance evaluating apparatus according to the second embodiment are the same as the functions of each unit in the electric power calculating apparatus according to the first embodiment, except the leaked-information analysis unit 80.

The leaked-information analysis unit 80 performs an electric power analysis using a power consumption in a logic circuit calculated by the power consumption calculation unit 20, analyzes information leaked from the logic circuit and outputs the analysis result.

The power consumption calculation unit in the tamper resistance evaluating apparatus calculates the power consumption based on an accumulated value of the number of times signals in the logic circuit change.

Otherwise the power consumption calculation unit in the tamper resistance evaluating apparatus calculates the power consumption based only on the number of times signals in the logic circuit change.

According to these facts, a power consumption calculating method is the same method as used in the first embodiment. Further, the test bench is the same as in the first embodiment.

It is next explained power analyses for analyzing leaked information performed by the leaked-information analysis unit 80.

Differential Power Analysis is used for an analysis of leaked information using a power consumption in a circuit by the leaked-information analysis unit 80 of the tamper resistance evaluating apparatus.

Otherwise, Simple Power Analysis is used for analyzing leaked information using a power consumption in a circuit by the leaked-information analysis unit 80 in the tamper resistance evaluating apparatus.

Otherwise, Timing Analysis is used for analyzing leaked information using a power consumption in a circuit by the leaked-information analysis unit 80 in the tamper resistance evaluating apparatus.

Specific explanations are given for each of the above-mentioned analyzing methods. Here, explanations are made by limiting security functions performed by a semiconductor device subject to an analysis to cipher. Power analyses are techniques, by analyzing a power consumption in a logic circuit of a semiconductor device for performing cipher (hereinafter abbreviated as an "encryption device"), to estimate secret information, specifically, an encryption key held by the encryption device.

Differential Power Analysis is one method of power analyses, wherein an encryption key is estimated, by inputting data of random values into an encryption device, to perform an encryption processing, measuring or calculating a power consumption in a circuit during processing, and performing a statistical processing against the obtained data.

A specific method of Differential Power Analysis is as follows.

(1) Input input data into a circuit as a subject and measure a power waveform during an encryption processing. It is generally necessary to obtain several thousands to several tens of thousands of data of the power waveform.

(2) Select a part of an encryption key (partial key) K of N-bit which can be attacked, and an attack point PT based on a disclosed algorithm of ciphers. PT is one bit of a virtual intermediate variable whose value is uniquely specified only by the input data and K, whereto all the bits of K relate. For example, S box in DES (Data Encryption Standard) corresponds to it.

(3) Calculate whether the values of PTs become 1 or 0, when the input data used in (1) is given to 2N ways of all the candidates for the partial key K.

(4) Divide the measured data into two groups based on the values of PTs, and calculates difference of average powers of each group. The candidate that makes the difference of the average powers greatest is the expected partial key K.

(5) Repeat (2) to (4) until a sufficient amount of information on the encryption key is obtained.

Simple Power Analysis is another method of Power Analysis, which estimates information related to an encryption key from a power waveform of a circuit performing an encryption.

For example, in a simple modular exponentiation operation, exponent is read from the upper digits in order, and multiplication, when the value of the exponent is "1", and square operation are repeated. When multiplication and square operation consume different power, information on the exponent can be obtained from the power waveform.

Timing Analysis is a different analyzing method from Power Analysis. The method is a method estimating an encryption key, when processing times of an encryption are different depending on encryption keys, by performing a statistical processing of the difference of the times.

It is next explained operations of the tamper resistance evaluating apparatus according to the second embodiment in accordance with a flowchart of processes of the tamper resistance evaluating apparatus indicated in FIG. 8.

In an information leakage evaluating method for evaluating a leakage of information from a circuit in the tamper resistance evaluating apparatus, it is performed a signal change time counting step for counting and storing in a signal change time memory unit the number of times signals in a logic circuit change, a power consumption calculating step for calculating a power consumption in the circuit based on the number of times signals in the logic circuit change, which is stored in the signal change time memory unit by the signal change time counting step, and a leaked-information analyzing step for analyzing information leaked from the circuit based on the power consumption of the circuit calculated by the power consumption calculating step.

Preparation such as inputting a logic circuit as a subject etc. into the file database 40 and producing simulation control information by the simulation control information producing unit 50 is the same as in the first embodiment.

Further, processes from Step S200 retrieving a piece of input data from an input data file to Step S206 producing time sequence electric power information by the time sequence electric power information producing unit 60 are the same as the processes from Step S100 to Step S106 according to the first embodiment. However, time sequence electric power information produced by the time sequence electric power information producing unit 60 in Step S206 is stored in the time sequence electric power information memory unit 61.

The leaked-information analysis unit 80 performs power analysis by using the time sequence electric power information retrieved from the time sequence electric power information memory unit 61, and stores the analysis result in the analysis result memory unit 81 (Step S207). For the power analysis, the above-mentioned Differential Power Analysis, Simple Power Analysis or Timing Analysis can be used.

The result displaying unit 70 retrieves the analysis result from the analysis result memory unit 81, and displays the analysis result in the same environment as in a case of an analysis of a real device, for example, by employing a display format by an oscilloscope etc. (Step S208)

In the way mentioned above, it is possible to detect a leakage of information from a logic circuit by calculating a power consumption consumed by a logic circuit as a subject in a certain time period by a logic simulation, and by performing a power analysis using the calculated power consumption.

According to the present embodiment, it is possible for the tamper resistance evaluating apparatus to count the number of times signals in a logic circuit change, to calculate a power consumption in the logic circuit based on the counted changes of signals, and to analyze information leaked from the logic circuit based on the calculated power consumption. As a result, it becomes possible for the tamper resistance evaluating apparatus to evaluate a tamper resistance of the logic circuit as a subject.

According to the present embodiment, it is possible to evaluate a tamper resistance of a circuit by using Differential Power Analysis by the tamper resistance evaluating apparatus.

According to the present embodiment, it is possible to evaluate a tamper resistance of a circuit by using Simple Power Analysis by the tamper resistance evaluating apparatus.

According to the present embodiment, it is possible to evaluate a tamper resistance of a circuit by using Timing Analysis by the tamper resistance evaluating apparatus.

According to the present embodiment, it is possible for the tamper resistance evaluating apparatus to calculate a power consumption based on an accumulated value of the number of times signals in a logic circuit change. In this way, it becomes unnecessary for the tamper resistance evaluating apparatus to calculate a load capacitance, and therefore, it becomes possible for the tamper resistance evaluating apparatus to calculate the power consumption in a logic circuit in a processing time shorter than ever before.

According to the present embodiment, it is possible for the tamper resistance evaluating apparatus to calculate a power consumption based only on the number of times signals in a logic circuit change. In this way, it becomes unnecessary for the tamper resistance evaluating apparatus to calculate a load capacitance, and therefore, it becomes possible for the tamper resistance evaluating apparatus to calculate the power consumption of a logic circuit in a processing time shorter than ever before.

According to the present embodiment, a tamper resistance is evaluated based on signal change information obtained by a logic simulation, and therefore, an evaluation more accurate than an evaluation by a simulation by the use of a software is made possible. Further, it becomes possible to perform an evaluation at higher speed than in a case of using a circuit simulator, in an upstream process of a design.

According to the present embodiment, it is possible to calculate a power consumption at a higher speed than ever before. As a result, it is possible to evaluate a tamper resistance of a circuit as a subject in a short time without difficulty by a logic simulation, in an upstream process of a circuit design.

Embodiment 3

In the third embodiment, it is explained an embodiment wherein a tamper resistance of a logic circuit is evaluated in an ideal state, where an influence of transient transition due to a delay of signals in a logic circuit as a subject is excluded, and which is independent of a semiconductor device or the layout and wiring.

A structure and functions of each unit of a tamper resistance evaluating apparatus, and a power consumption calculating method according to the third embodiment is the same as in the second embodiment.

However, the signal change time counter unit 10 counts the number of times signals in a circuit change by regarding that the signals change one time when a signal change time in a prescribed time period is an odd number of times, and by regarding that the signals change zero time when the signal change time in a prescribed time period is an even number of times.

It is here explained the signal change time in a logic simulation. The signal change time counter unit 10 in the tamper resistance evaluating apparatus according to the third embodiment counts all the changes of signal occurred in a logic circuit as the signal change time. The signal change time includes changes of signal occurred in a logic circuit due to transient transition of signals. In other words, only whether or not signals change after a lapse of one clock cycle should be essentially regarded as the result of changes of signal. However, in fact, changes of signal occur even during transient transition while one clock cycle elapses. The result is that the values of the signal change time counted by the signal change time counter unit 10 includes the number of times signal changes occurred while the one clock cycle elapses.

To detect a leakage of information from a logic circuit correctly, it is necessary to calculate a power consumption in the logic circuit correctly, and for that purpose, it is necessary to count the signal change time from which the number of times signals change in transient transition is excluded. The signal changes in transient transition as the cause are generated due to a delay of signals occurred by features of a semiconductor device or the layout and wiring. Therefore, to detect a leakage of information correctly, it is necessary to count the signal change time of an ideal circuit without a delay, and calculates a correct power consumption of the circuit.

An actual delay fluctuates due to the layout and wiring, features of a transistor or other causes, and it is impossible in a logic simulation to estimate a delay of each moment exactly the same as in a real device. However, the signal change time obtained in the logic simulation can be greatly different dependent on a small differential delay. Further, this delay is dependent on devices to a great extent. In other words, uncertainties such as the display and wiring or the device dependency are concerned in the purpose of evaluating a tamper resistance logically in an upstream process of a design.

To resolve the problems, exclude the device dependency and the layout and wiring dependency as much as possible, and to evaluate a tamper resistance genuinely in a logical way, it is only necessary to count the signal change time when an ideal device without a transmission delay of signals is assumed.

As a means for realizing this, it is conceivable to set a delay quantity in a logic simulation at zero delay, for example. However, in this method, it is necessary to retry the logic simulation by changing the delay quantity, when it is desired to perform the evaluation in consideration of a delay to some extent.

Therefore, in the present embodiment, to perform evaluations in a case of considering a delay and in a case of not considering a delay more efficiently, a logic simulation is performed for only one time in consideration of a delay, and when in a case wherein a delay is considered, the signal change time obtained in the logic simulation is used without modification, and when in a case wherein a delay is not considered, it is counted that signals change one time when signals change for an odd number of times during one clock cycle, and it is counted that signals change zero time when signals change for an even number of times. Of course, it is possible to perform the both together.

In this way, it is possible to perform, in one time of the logic simulation, both the evaluation in a case of considering a delay, and the evaluation in a case of not considering a delay, that is, in a case of assuming an ideal device without a delay.

An example of a program for calculating a power consumption when the signal change time is counted according to this is shown in FIG. 9. In this program, by extracting a change time TC of all the signals by the power consumption calculation unit 20 from a file fpr, wherein a signal change time counted by the signal change time counter unit 10 are recorded, by finding tc, the total of the extracted TC, and then by finding a remainder of tc divided by 2 by "tc %=2", the total sum of the signal change time is to be zero time when the number of times signals change is an even number of times, and to be one time when the number of times signals change is an odd number of times. Here, the file fpr wherein the signal change time is recorded is the same as the table 1 in the first embodiment, and the file wherein the total sum is recorded is the same as the table 2.

Operations of the tamper resistance evaluating apparatus according to the third embodiment are the same as in the second embodiment. However, as mentioned above, only the signal change time counting method by the signal change time counter unit 10 is different.

According to the present embodiment, it is possible to count the signal change time by excluding the changes of signal in transient transition, whereby a power consumption in a logic circuit can be calculated correctly. As a result, it becomes possible to evaluate a tamper resistance of a logic circuit at an ideal state, which is independent of a semiconductor device or the layout and wiring.

According to the present embodiment, it is possible to perform an evaluation of a tamper resistance of an ideal logic circuit, wherein an influence of transient transition is excluded and a delay is eliminated, and an evaluation of a tamper resistance of a logic circuit including a delay reflecting an influence of transient transition, by one time of a logic simulation.

Embodiment 4

In the fourth embodiment, it is explained an embodiment wherein an evaluation of a tamper resistance is performed only against a desired area of a logic circuit.

A structure and functions of each unit of a tamper resistance evaluating apparatus, and a power consumption calculating method according to the fourth embodiment is the same as in the second embodiment.

However, the tamper resistance evaluating apparatus configures the desired area of a logic circuit as a logic circuit to count the number of times signals change by the signal change time counter unit 10.

Although it is not explicitly explained in the first embodiment to the third embodiment, it is assumed that a calculation of a power consumption is performed against whole the logic circuit as a subject. However, for clarifying the mechanism of from what part of the logic circuit and how secret information is leaked, it is convenient if it is possible to calculate a power consumption only of a specific circuit part in the logic circuit as a subject.

As a method for realizing this, there is a method to specify a circuit part wherein changes of signal are to be extracted to a logic simulator 30. However, in this method, it is necessary to perform the logic simulation again when a power consumption of another circuit part is calculated, by changing the specification of the circuit part.

Therefore, the logic simulator 30 outputs signal change information of a larger circuit part including the specified circuit part, based on the specification that the signal change time of what circuit part is to be counted. Then, the signal change time counter unit 10 changes the circuit part among the large circuit part and calculates the number of times signals change in each circuit part, and the power consumption calculation unit 20 calculates the power consumption in the circuit part.

In this way, the power consumption in a plurality of circuit parts can be calculated by one time of a logic simulation.

An example of a program for counting the signal change time in this way, and for calculating the power consumption using it is described in FIG. 10. This program retrieves a circuit part included in an area of a specified large logic circuit by instance, performs a logic simulation against the retrieved circuit part, extracting the signal change time TC of all the signals by the power consumption calculation unit 20 from a file fpr wherein the counted signal change time is recorded by the signal change time counter unit 10, and finding the total sum of the extracted TC.

Figure 11:
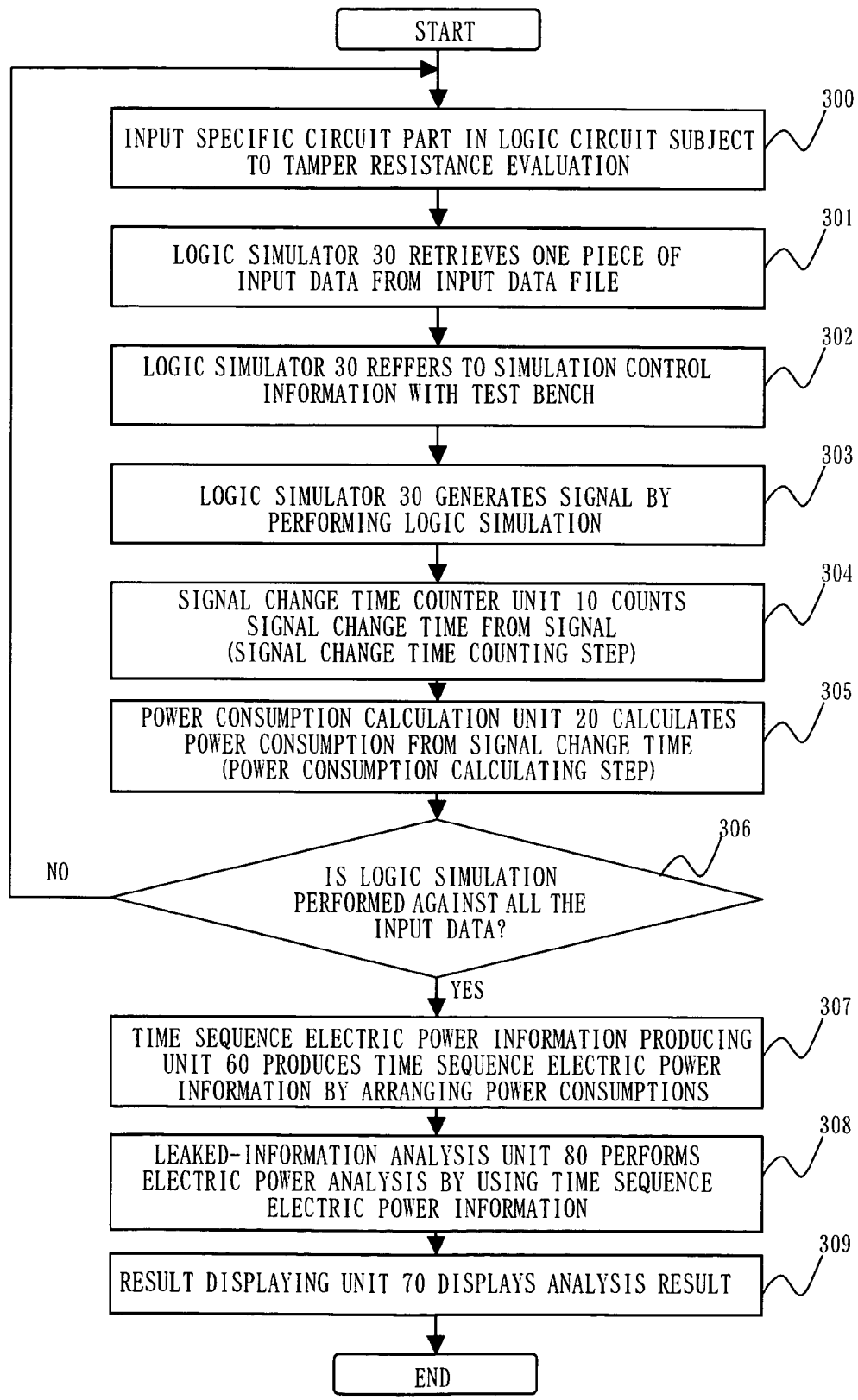
FIG. 11 is a flowchart describing the processes of the tamper resistance evaluating apparatus according to the fourth embodiment.

Next, it is explained operations of the tamper resistance evaluating apparatus according to the fourth embodiment by using a flowchart of processes of the tamper resistance evaluating apparatus described in FIG. 11.

First, as in the first embodiment, preparations such as inputting a logic circuit as a subject etc. into a file database 40, and producing simulation control information by a simulation control information producing unit 50 are performed.

Next, the tamper resistance evaluating apparatus inputs a specific circuit part in a logic circuit subject to an evaluation of a tamper resistance (Step S300). The following operations from Step S301 to Step S309 are the same as the operations from Step S200 to Step S208 of the tamper resistance evaluating apparatus according to the third embodiment, however, in Step S303, the logic simulator performs a logic simulation of a wider range of a circuit part than the specific circuit part in the logic circuit input in Step S300.

According to the present embodiment, it is possible for the tamper resistance evaluating apparatus to change circuit parts and to calculate the power consumption only by performing a logic simulation one time by the logic simulator. As a result, it becomes possible to evaluate a tamper resistance of a plurality of circuit parts by one time of a logic simulation, and to perform an evaluation efficiently.

It is explained above an embodiment of the tamper resistance evaluating apparatus in an upstream process of a hardware design of a security device, wherein a signal change time of the hardware per a fixed time period is counted by a logic simulator, and Differential Power Analysis is performed by using power consumption information obtained by estimating a power consumption per the fixed time period based on the signal change time.

It is explained an embodiment of the tamper resistance evaluating apparatus wherein Simple Power Analysis using power consumption information obtained by the similar method is performed.

It is explained an embodiment of the tamper resistance evaluating apparatus wherein Timing Analysis using power consumption information obtained by the similar method is performed.

It is explained an embodiment of the tamper resistance evaluating apparatus wherein a power estimating time is shortened significantly by regarding the load capacitances of all the signals as almost the same, and approximating in a way "power consumption≈sum total of changes of signal".

It is explained an embodiment of the tamper resistance evaluating apparatus wherein essential features of a circuit, which is independent of devices or the layout and wiring, and which excludes an influence of transient transition due to a delay, is evaluated by finding out electric power in a case of assuming an ideal device without a delay, by counting changes of signal for one time when the signal changes for an odd number of times during one clock cycle, and counting changes of signal for zero time when the signal changes for an even number of times.

It is explained an embodiment of the tamper resistance evaluating apparatus wherein a resistance of each circuit part against attacks is evaluated, by estimating electric power, not of the whole security device, but only of encryption core and each of its inner modules, or of a specific group of signals, and by performing analysis against each of them.

In each of the above-mentioned embodiments, the electric power calculating apparatus and the tamper resistance evaluating apparatus can be implemented by a computer.

The electric power calculating apparatus and the tamper resistance evaluating apparatus includes a CPU (Central Processing Unit) for implementing a program, which is not shown in the diagrams. The CPU connects to a ROM (Read Only Memory), a RAM (Random Access Memory), a communication board, a displaying device, a keyboard, a mouse, a FDD (Flexible Disk Drive), a CDD (Compact Disc Drive), a magnetic disk drive, an optical disk device, a printer device and a scanner device etc. via a bus, for example.

The RAM is an example of a volatile memory. The ROM, the FDD, the CDD, the magnetic disk drive and the optical disk drive are examples of nonvolatile memories. These are examples of memory apparatuses or memory units.

Information handled by the electric power calculating apparatus and the tamper resistance evaluating apparatus in each of the above-mentioned embodiments is recorded by and retrieved from a memory apparatus or a memory unit.

The communication board connects to, for example, a LAN (Local Area Network), the Internet, or an ISDN (Integrated Services Digital Network) etc.

The magnetic disk drive stores an operating system (OS), a window system, a group of programs and a group of files. The group of programs is implemented by the CPU, the OS, and the window system.

Apart or all of the electric power calculating apparatus and the tamper resistance evaluating apparatus can be composed of programs that can be implemented by a computer. They can also be realized by a firmware stored in a ROM. Otherwise, they can be implemented by a combination of a software and a hardware, or a software, a hardware and a firmware.

The group of programs includes programs that allow a CPU to implement processes explained as ". . . units" in the explanations of each embodiment. These program are written in computer languages, such as C language, HTML (Hyper Text Markup Language), SGML (Standard Generalized Markup Language) or XML (extensible Markup Language) etc.

The above-mentioned programs are stored in the other memory media, such as a magnetic disk drive, a FD (Flexible Disk), an optical disk, a CD (Compact Disk), a MD (Mini Disk) and a DVD (Digital Versatile Disk), which are retrieved and implemented by a CPU.

EXAMPLE

Figure 12:
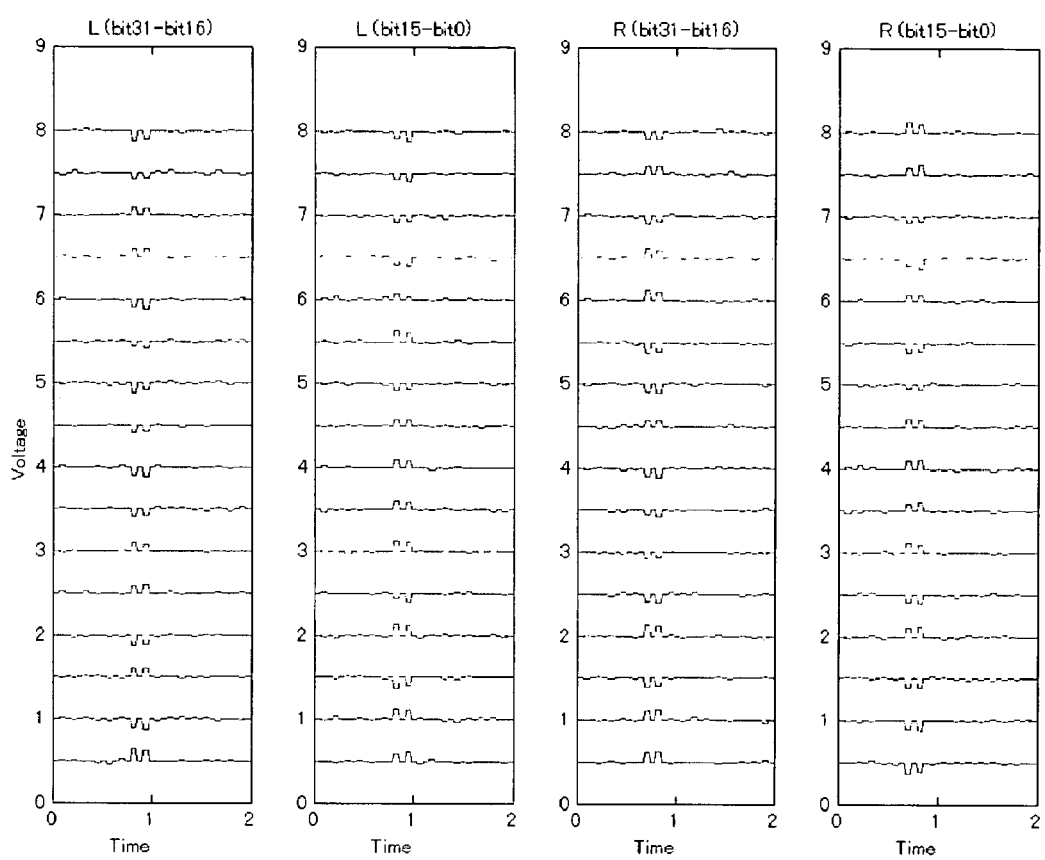
FIG. 12 is an example of results of evaluating a tamper resistance of a DES encryption circuit by Differential Power Analysis described in the embodiments.
Figure 13:
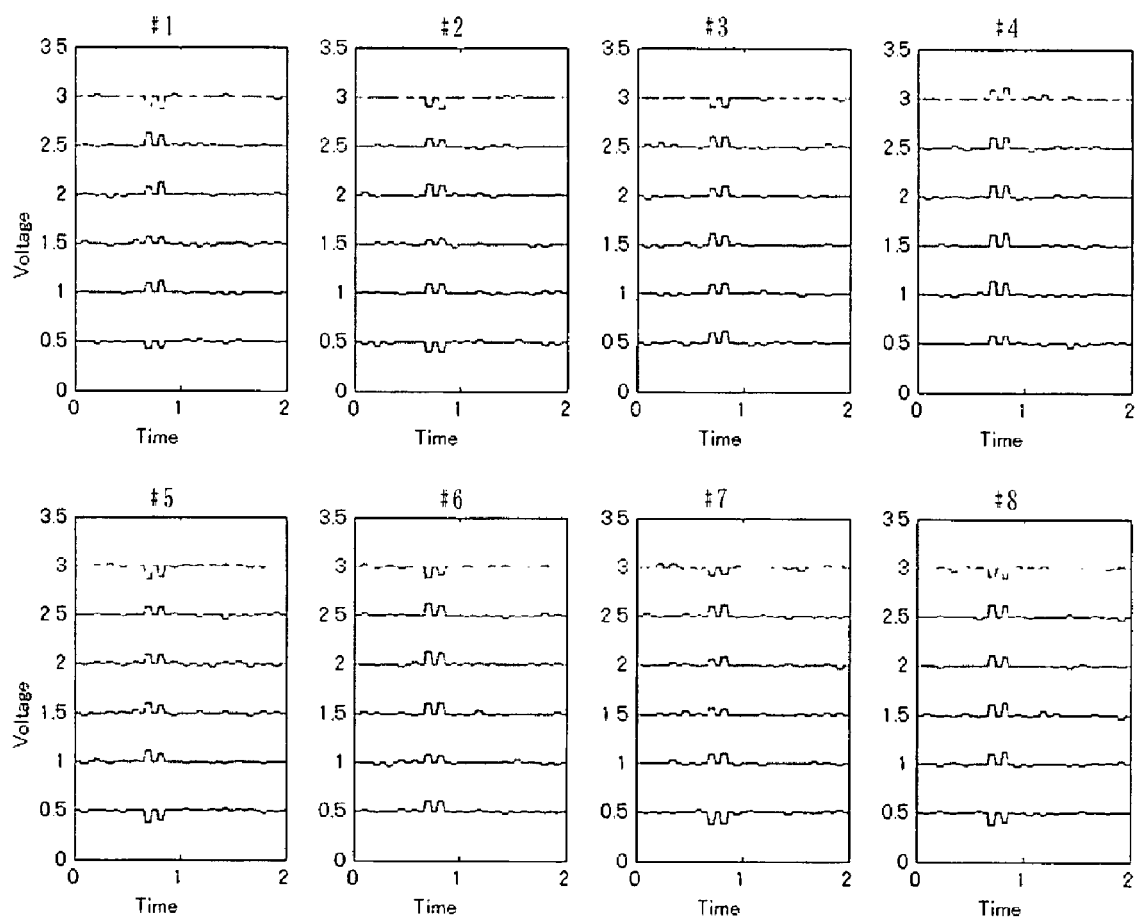
FIG. 13 is an example of results of evaluating a tamper resistance of a DES encryption circuit by Differential Power Analysis described in the embodiments.
Figure 14:
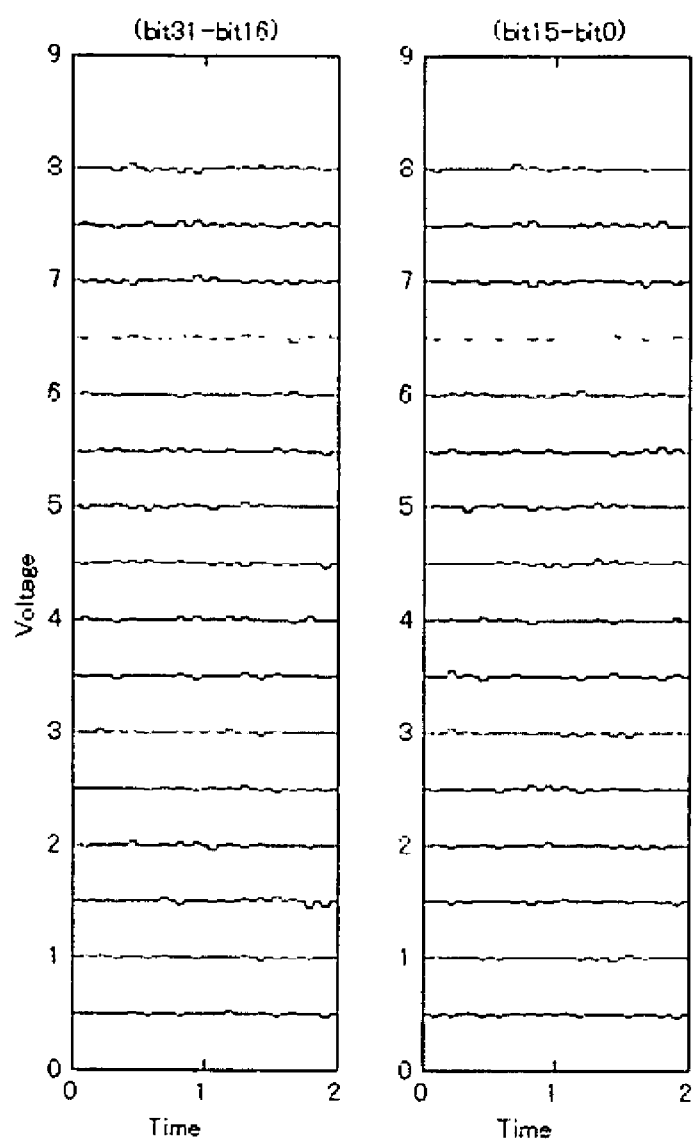
FIG. 14 is an example of results of evaluating a tamper resistance of a DES encryption circuit by Differential Power Analysis described in the embodiments.

In the present examples, it is described examples of a tamper resistance evaluation of a DES encryption circuit by using Differential Power Analysis in FIG. 12, FIG. 13, and FIG. 14. These diagrams show results of finding differential power depending on whether one bit of intermediate variables becomes zero or one, when several intermediate variables are resolved into one bit each, which are organized in view-graph format. Horizontal axis is a time scale and vertical axis is a differential power scale indicated with respect to one bit. Characteristic spikes occurred in the graphs relate to secret information.

Figure 15:
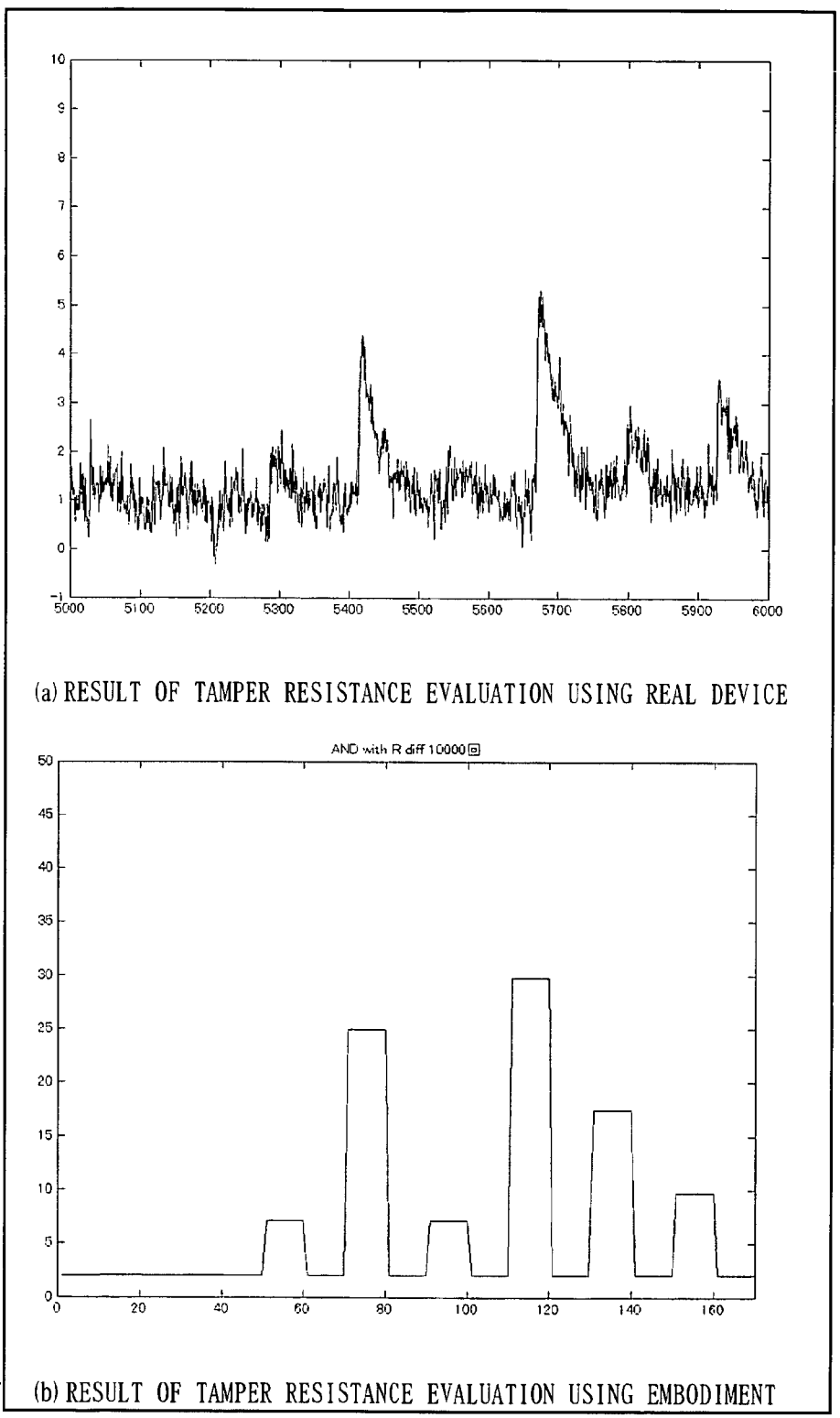
FIG. 15 (a) is a diagram describing results of performing a tamper resistance evaluation of a logic circuit installed on a real device, and FIG. 15 (b) is a diagram describing results of performing a tamper resistance evaluation of the same logic circuit using the embodiments, in a case of the operation modes wherein differential power of a logic circuit is relatively large.
Figure 16:
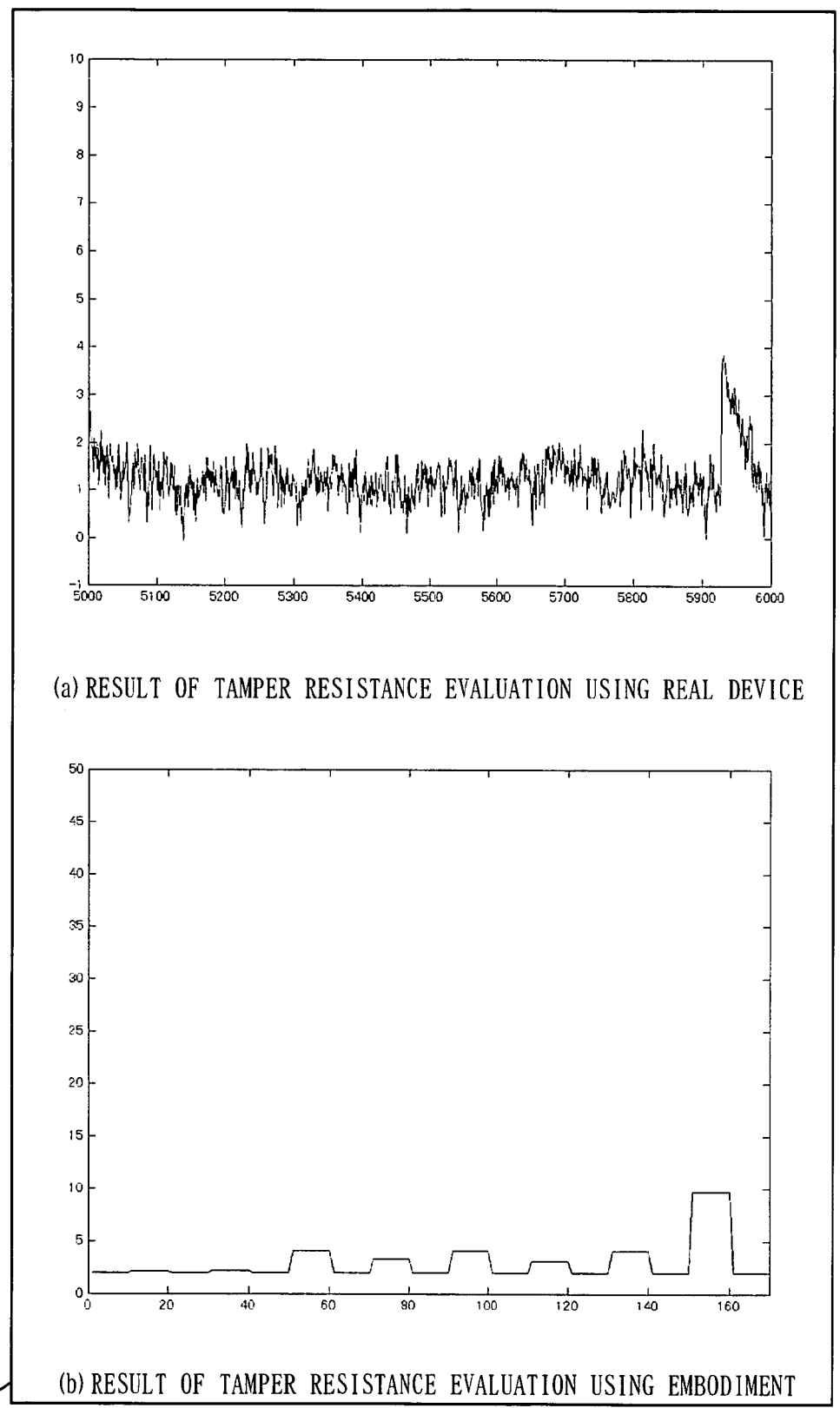
FIG. 16 (a) is a diagram describing results of performing a tamper resistance evaluation of a logic circuit installed on a real device, and FIG. 16 (b) is a diagram describing results of performing a tamper resistance evaluation of the same logic circuit using the embodiments, in a case of the operation modes wherein differential power of a logic circuit is relatively small.

Further, results of performing a tamper resistance evaluation of a logic circuit using a real device, and results of performing a tamper resistance evaluation of a logic circuit as same as a circuit installed on a real device by using the above-mentioned embodiments are described in FIG. 15 and FIG. 16. FIG. 15 is for a case of an operation mode wherein differential power of a logic circuit subject to an evaluation is relatively large, and FIG. 16 is for a case of an operation mode wherein differential power of a logic circuit subject to an evaluation is relatively small. (a) shows the results of performing a tamper resistance evaluation by using a real device, and (b) show the results of performing a tamper resistance evaluation by a logic simulation explained in the embodiments, respectively. In the both cases, the analyzing method is Differential Power Analysis. The scales of the vertical axes (differential power) and the horizontal axes (time) are relative, and are not so significant. Further, the above-mentioned operation modes can be selected by inputting signals in the logic circuit externally.

From the viewpoint of the presence or absence of information leakage, the results of performing a tamper resistance evaluation described in the present examples agree with the results of performing a tamper resistance evaluation using a real device with a high accuracy. It is also shown that differences of the differential power according to the operation modes can be estimated by a logic simulation.

EXPLANATION OF REFERENCES

10 Signal change time counter unit, 11 Signal change time memory unit, 20 Power consumption calculation unit, 21 Power consumption memory unit, 30 Logic simulator, 31 Signal change information memory unit, 40 File database, 50 Simulation control information producing unit, 51 Simulation control information memory unit, 60 Time sequence electric power information producing unit, 61 Time sequence electric power information memory unit, 70 Result displaying unit, 80 Leaked-information analysis unit, 81 Analysis result memory unit.

The invention claimed is:

1. An electric power calculating apparatus for calculating a power consumption comprising:
   a signal change time counter unit for counting and storing in a signal change time memory unit a number of times a signal in a logic circuit changes; and
   a power consumption calculation unit for calculating a power consumption in the logic circuit based on an accumulated value of the number of times the signal in the logic circuit changes, the number of times being stored in the signal change time memory unit by the signal change time counter unit.

2. The electric power calculating apparatus of claim 1, wherein the power consumption is calculated based only on the number of times the signal in the logic circuit changes.

3. The electric power calculating apparatus of claim 2, comprising:
   a power consumption calculation unit for calculating a power consumption in the logic circuit based only on the number of times the signal in the logic circuit changes.

4. An electric power calculating method for calculating a power consumption comprising:
   a signal change time counting step for counting and storing in a signal change time memory unit a number of times a signal in a logic circuit changes; and
   a power consumption calculating step for calculating a power consumption in the logic circuit based on an accumulated value of the number of times the signal in the logic circuit changes, the number of times being stored in the signal change time memory unit by the signal change time counting step.

5. The electric power calculating method of claim 4, wherein the power consumption is calculated based only on the number of times the signal in the logic circuit changes.

6. The electric power calculating method of claim 5, comprising;
   a power consumption calculating step for calculating a power consumption in the logic circuit based only on the number of times the signal in the logic circuit changes.

7. A tamper resistance evaluating apparatus for detecting a leakage of information from a logic circuit, and for evaluating a tamper resistance of a logic circuit, the tamper resistance evaluating apparatus comprising:
   a signal change time counter unit for counting and storing in a signal change time memory unit a number of times a signal in a logic circuit changes;
   a power consumption calculation unit for calculating a power consumption in the logic circuit based on the number of times the signal in the logic circuit changes, the number of times being stored in the signal change time memory unit by the signal change time counter unit; and
   a leaked-information analysis unit for analyzing information leaked from the logic circuit based on the power consumption in the logic circuit, the power consumption being calculated by the power consumption calculation unit.

8. The tamper resistance evaluating apparatus of claim 7, wherein an analysis of leaked information based on the power consumption in the logic circuit by the leaked-information analysis unit is a differential power analysis.

9. The tamper resistance evaluating apparatus of claim 7, wherein an analysis of leaked information based on the power consumption in the logic circuit by the leaked-information analysis unit is a simple power analysis.

10. The tamper resistance evaluating apparatus of claim 7, wherein an analysis of leaked information based on the power consumption in the logic circuit by the leaked-information analysis unit is a timing analysis.

11. The tamper resistance evaluating apparatus of claim 7, wherein the power consumption calculation unit calculates the power consumption based on an accumulated value of the number of times the signal in the logic circuit changes.

12. The tamper resistance evaluating apparatus of claim 7, wherein the power consumption calculation unit calculates the power consumption based only on the number of times the signal in the logic circuit changes.

13. The tamper resistance evaluating apparatus of claim 7, wherein the signal change time counter unit counts a number of times a signal in a circuit changes by regarding that a signal changes one time when a signal change time in a prescribed time period is an odd number of times, and by regarding that a signal changes zero time when a signal change time in a prescribed time period is an even number of times.

14. The tamper resistance evaluating apparatus of claim 7, wherein the signal change time counter unit sets a prescribed area of a logic circuit as a logic circuit in which a number of times a signal changes is counted.

15. A tamper resistance evaluating method, wherein a leaked-information evaluating method for evaluating a leakage of information from a circuit is performed, the tamper resistance evaluating method comprising:
   a signal change time counting step for counting and storing in a signal change time memory unit a number of times a signal in a logic circuit changes;
   a power consumption calculating step for calculating a power consumption in a circuit based on the number of times the signal in the logic circuit changes, the number of times being stored in the signal change time memory unit by the signal change time counting step; and
   a leaked-information analyzing step for analyzing information leaked from the circuit based on the power consumption in the circuit, the power consumption being calculated by the power consumption calculating step.

* * * * *